(12) United States Patent
Someya et al.

(10) Patent No.: US 8,931,757 B2
(45) Date of Patent: Jan. 13, 2015

(54) ELECTRIC ACTUATOR

(71) Applicant: Azbil Corporation, Tokyo (JP)

(72) Inventors: Hideaki Someya, Tokyo (JP); Makoto Saruwatari, Tokyo (JP); Takuji Abe, Tokyo (JP)

(73) Assignee: Azbil Corporation, Tokyo (JP)

( * ) Notice: Subject to any disclaimer, the term of this patent is extended or adjusted under 35 U.S.C. 154(b) by 134 days.

(21) Appl. No.: 13/890,182

(22) Filed: May 8, 2013

(65) Prior Publication Data

US 2013/0300320 A1    Nov. 14, 2013

(30) Foreign Application Priority Data

May 8, 2012   (JP) ................. 2012-106568

(51) Int. Cl.
| | |
|---|---|
| *F16K 31/02* | (2006.01) |
| *H02P 3/02* | (2006.01) |
| *H02P 29/02* | (2006.01) |
| *H02J 9/06* | (2006.01) |
| *H02P 23/00* | (2006.01) |

(52) U.S. Cl.
CPC ............. *H02P 3/02* (2013.01); *H02P 29/025* (2013.01); *H02J 9/061* (2013.01); *H02P 23/0072* (2013.01)
USPC ............ 251/129.01; 251/21; 251/59; 251/92; 251/180; 251/318; 236/1 G; 236/49.3; 236/67; 62/186

(58) Field of Classification Search
USPC ................ 318/139, 453, 560; 251/21, 59, 92, 251/129.01, 180, 289, 318; 236/1 G, 49.3, 236/67; 62/186
See application file for complete search history.

(56) References Cited

U.S. PATENT DOCUMENTS

| | | | | |
|---|---|---|---|---|
| 7,586,279 | B2 * | 9/2009 | Theunissen et al. | 318/466 |
| 2011/0215747 | A1 * | 9/2011 | Saruwatari et al. | 318/453 |

FOREIGN PATENT DOCUMENTS

| | | |
|---|---|---|
| JP | H11-101359 A | 4/1999 |
| JP | 2006-161855 A | 6/2006 |
| JP | 4774207 B2 | 9/2011 |

\* cited by examiner

*Primary Examiner* — Antony M Paul
(74) *Attorney, Agent, or Firm* — Troutman Sanders LLP (57) ABSTRACT

An electric actuator has a motor, an electricity storing body, a switch, a setting unit, a resetting unit and a setting-off unit. The switch is provided in a supply path for electric power from the electricity storing body to the motor. The switch opens and closes the supply path. The setting unit is operated through receiving a supply of electric power from the electricity storing body in response to an instruction from an operator. The setting unit opens the switch. The resetting unit is operated through r a supply of electric power from the external power supply when the external power supply has been restored from being cut off. The resetting unit closes the switch that is provided in the supply path. The setting-off unit sets off the supply of electric power from the external power supply to the resetting unit after a specific delay time has elapsed.

4 Claims, 13 Drawing Sheets

Background Art

FIG. 13

Background Art

ELECTRIC ACTUATOR

CROSS REFERENCE TO RELATED APPLICATION

This application claims priority to Japanese Patent Application No. 2012-106568, filed on May 8, 2012, the entire content of which being hereby incorporated herein by reference.

FIELD OF TECHNOLOGY

The present invention relates to an electric actuator for driving force controlled elements such as valves and dampers.

BACKGROUND

Conventionally, in air-conditioning equipment electric actuators have been used for performing operations for opening and closing valves that are installed within cold water or hot pipes, and operations for adjusting the openings of dampers in order to increase or decrease the flow rate of conditioned air that is supplied to an air-conditioned area through a duct.

In a normal electric actuator of this type, a motor is provided with in the electric actuator, to operate so as to cause the opening of the controlled element such as a valve or a damper to go to a setting opening in response to a control command from an air conditioner controller.

With this type of electric actuator, if there is an interruption to the power that is supplied, the degree of opening of the controlled element maintains the operating opening from immediately prior to the power outage, and appropriate opening control is no longer performed.

Given this, there have been proposals, that have been put into practice, for electric actuators of a type wherein, if there is an interruption to the power that is supplied to the electric actuator, it is forcibly driven to a specific opening (such as fully closed) and maintains that specific opening until the power supply is again restored to the normal state. In the below, this type of electric actuator will be termed "an electric actuator with an emergency shutdown function."

At present, there are, specifically, two types of electric actuators with emergency shutdown functions that have been proposed, one type known as the spring return type, and the other type known as the secondary power supply driven type.

The spring return-type electric actuator is loaded with a return spring that applies a force on the driveshaft of the electric actuator so as to maintain a fully-closed state of the controlled element, where, when power is supplied, a driving motor is driven against the force applied by the return spring to adjust the opening of the controlled element, such as a valve or a damper, and if the power is interrupted the force applied by the return spring forcibly drives the controlled element, such as the valve or the damper, to the specific opening.

On the other hand, in the secondary power supply driven-type electric actuator, an electricity storing body structured from a storage battery or an electric double-layer capacitor or the like, is provided, where, when power is supplied, a motor is driven by the power supply to adjust the opening of the controlled element, such as a valve or a damper, and when the power is interrupted the electricity storing body is used as the operating power supply to drive the electric motor to drive the controlled element, such as the valve or the damper, forcibly to the specific opening.

However, when these two types of electric actuators with emergency shutdown functions are compared, in the spring return type the force applied by the return spring acts in resistance to the driving by the motor during normal operation, requiring the use of a motor with a large torque in order to overcome this resistance, and thus there is the shortcoming that this causes the electric actuator to be large, heavy, and costly.

In contrast, with the secondary power supply driven type, there is no shortcoming such as in the spring return type, and in recent years there have been improvements in the storage capacity of the storage batteries or electric double layer capacitors that serve as the electricity storing body, causing the secondary power supply driven-type electric actuator to be advantageous.

Figure 12:
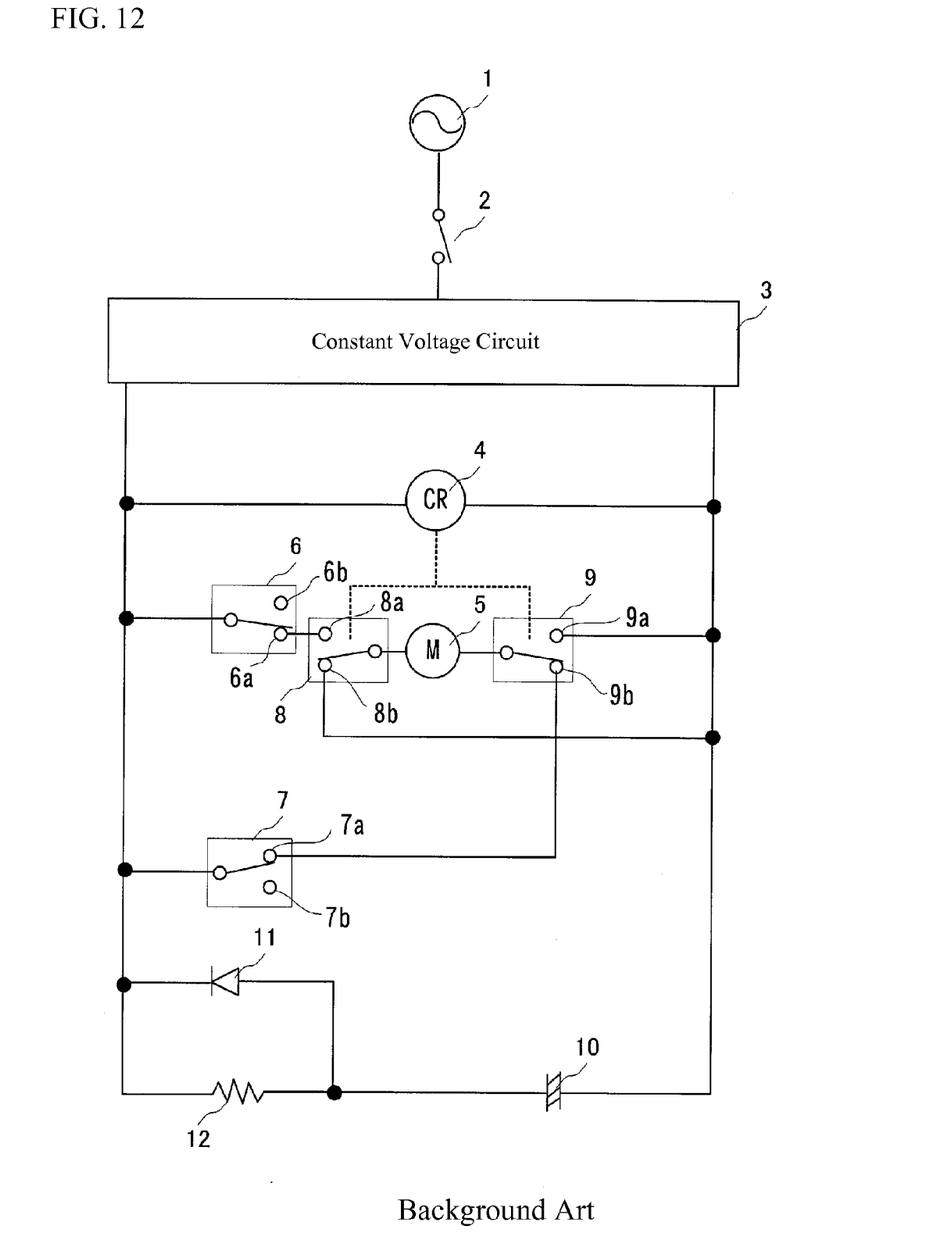
FIG. 12 is a diagram illustrating a motor driving circuit for an electric shutdown valve set forth in the JP '359.

FIG. 12 illustrates a motor driving circuit for an electric shutdown valve set forth in, for example, Japanese Unexamined Patent Application Publication H11-101359 (the "JP '359"). In this figure, 1 is a commercial power supply, 2 is a power supply switch, 3 is a constant voltage circuit for converting an AC voltage into a specific DC voltage, 4 is a relay, 5 is a motor (DC motor), 6 is an opening-side limit switch, 7 is a closing-side limit switch, 8 and 9 are contact points (relay contact points) of the relay 4, 10 is an electricity storing body (electric double layer capacitor), 11 is a diode, and 12 is a resistance.

In this motor driving circuit, when the power supply switch 2 is turned ON, a DC voltage is outputted from the constant voltage circuit 3, magnetically exciting the relay 4, causing the relay contact points 8 and 9 to both switch to the terminals 8a and 9a. At this time, the motor 5 is in an intermediate opening state, where the opening-side limit switch 6 is at the terminal 6a side and the closing-side limit switch 7 is at the terminal 7a side. Moreover, let us assume that a full-open instruction has been received as an opening instruction.

Given this, the motor 5 rotates to drive the valve in the opening direction. Following this, when the opening-side limit switch 6 operates to switch to the terminal 6b side, that is, when the valve is fully open, the motor 5 stops. On the other hand, the electricity storing body 10 is charged through the resistance 12.

If, in this state, a power outage were to occur, then the DC voltage would cease to be outputted from the constant voltage circuit 3, the magnetic excitation of the relay 4 would disappear, and the relay contact points 8 and 9 would switch to the respective terminal 8b and 9b sides. At this time, the electric power stored in the electricity storing body 10 would flow through the diode 11 and the closing-side limit switch 7 to be supplied to the motor 5, to run the motor 5 in the opposite direction, to drive the valve in the closing direction. When the closing-side limit switch 7 operates to switch to the terminal 7b side, that is, when the valve is fully closed, the motor 5 stops.

However, with the motor driving circuit illustrated in FIG. 12, during maintenance there are cases wherein one may wish to maintain the valve opening at an arbitrary position other than being fully closed with the power supply switch 2 OFF, and in such cases it is necessary to discharge the power that is stored in the electricity storing body 10.

That is, when, during maintenance, the power supply switch 2 is turned OFF, the motor 5 is forcibly driven by the electric power that is stored in the electricity storing body 10, because a situation that is identical to that of a power outage has occurred, so the valve will fully close. When, in such a state, one attempts to move this fully-closed valve in the opening direction, the closing-side limit switch 7 switches to the terminal 7a side, and the supply of electric power from the electricity storing body 10 to the motor 5 is restarted, so the motor 5 attempts to return the valve to the fully-closed state.

Consequently, when, at the time of maintenance, one wishes to turn the power supply switch 2 OFF and maintain the valve opening at an arbitrary position other than fully closed, it is necessary to discharge the electric power that is stored in the electricity storing body 10 until the motor no longer attempts to return the valve to the fully-closed state. Because of this, not only does this produce waiting time in the operation, waiting for the discharge to be complete, but also wastes the electric power that is discharged.

Note that Japanese Patent 4774207 (the "JP '207") shows a shutdown valve equipped with a switch and power supply monitoring means between a rechargeable power supply (electricity storing body) and actuator (motor), where, when the power supply monitoring means detect a power outage, the switch is turned ON to connect the rechargeable power supply to the actuator, where, when the actuator is operated by the connected rechargeable power supply and becomes fully closed, the switch turns OFF, to terminate the connection between the rechargeable power supply and the actuator, where the valve can be opened using an opening/closing handle.

Figure 13:
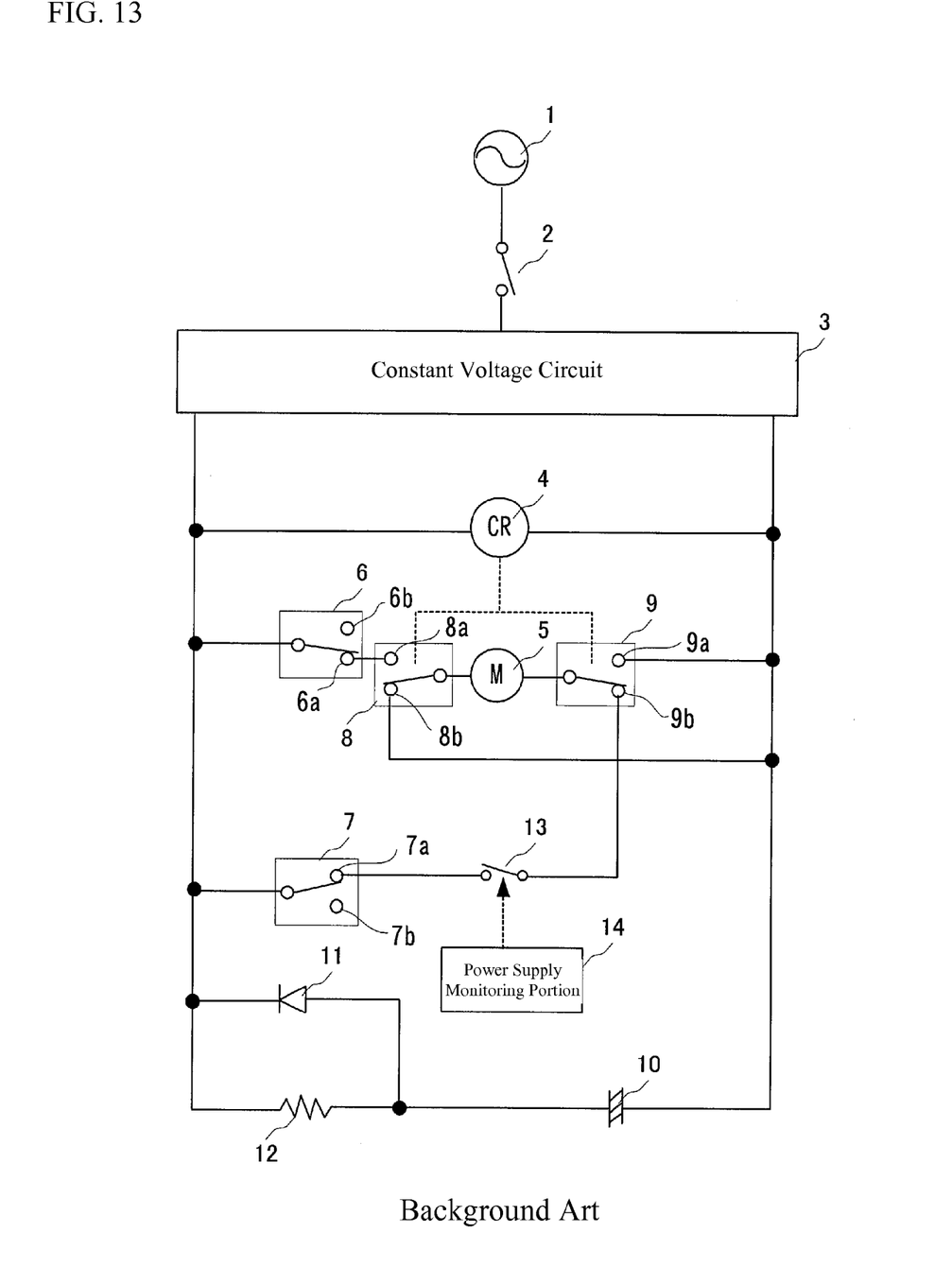
FIG. 13 is a diagram illustrating a motor driving circuit contemplating the application of the technology described in the JP '207.

FIG. 13 illustrates a motor driving circuit contemplating the application of the technology shown in the JP '207. In this motor driving circuit, a switch 13 that is configured corresponding to the switch described in the JP '207 is provided and a power supply monitoring portion 14, structured corresponding to the power supply monitoring means, is provided. The power supply monitoring portion 14 detects a power outage to turn the switch 13 ON.

In the configuration illustrated in this FIG. 13, when, at the time of maintenance, the power supply switch 2 is turned OFF, not only do the relay contact points 8 and 9 switch to the terminal 8b and 9b sides, but the switch 13 is turned ON by the power supply monitoring portion 14, and the electric power that is stored in the electricity storing body 10 is supplied to the motor 5 through the diode 11, the closing-side limit switch 7 and the switch 13. Doing so causes the motor 5 to rotate in the opposite direction, so the valve is driven in the closing direction. When the closing-side limit switch 7 operates to switch to the terminal 7b side, that is, when the valve is fully closed, the motor 5 stops. Moreover, when the valve is fully closed, the switch 13 is turned OFF.

Once the switch 13 has been turned OFF, then the OFF state is maintained regardless of the state of opening/closing of the valve. Because of this, when the handle is operated manually to drive the valve open, the electric power that is stored in the electricity storing body 10 is not supplied to the motor 5, notwithstanding the closing-side limit switch 7 operating to switch to the terminal 7a side. Because of this, it is possible to manually drive the valve open, even without discharging the electric power that is stored in the electricity storing body 10.

However, while, with this configuration, it is necessary to turn the switch 13 ON in order to restore the normal operating state after maintenance has been completed, when the operation for returning the switch 13 to ON (the operation for restoring the normal operating state) is performed manually, there is the possibility that there will be forgotten the restoration operation. Moreover, while one may consider providing timing means to turn the switch 13 ON after a specific amount of time has elapsed after the valve is closed, based on the time of the timing means, there is a problem that this constrains the time over which the valve can be opened and closed manually.

The present invention was created to solve such problems, and an aspect thereof is to provide an electric actuator wherein maintenance can be performed without a completely discharging the electric power that is stored in the electricity storing body, without forgetfulness of the operation for restoring the normal operating state, and without time constraints.

Moreover, it is to provide an electric actuator wherein it is possible to switch to a maintenance mode without shutting off the external power supply, that is, while still in a powered state.

SUMMARY

The present invention, in order to achieve such an aspect, is an electric actuator having a motor that receives a supply of electric power from an external power supply to drive a controlled element and an electricity storing body that is charged through receiving a supply of electric power from the external power supply, wherein, at a time wherein the external power supply is cut off, the motor is driven forcibly by electric power stored in the electricity storing body, and when the arrival of the controlled element, driven by the motor, at a specific opening is detected, the supply of power from the electricity storing body to the motor is cut off. The electric actuator further has a switch, provided in a supply path of electric power from the electricity storing body to the motor, for opening and closing the supply path for electric power from the electricity storing body to the motor, a setting unit, operated through receiving a supply of electric power from the electricity storing body in response to an instruction from an operator, for opening the switch provided in the supply path for electric power from the electricity storing body to the motor, a resetting unit, operated through receiving a supply of electric power from the external power supply when the external power supply has been restored from being cut off, for closing the switch that is provided in the supply path of electric power from the electricity storing body to the motor, and a setting-off unit that sets off the supply of electric power from the external power supply to the resetting unit after a specific delay time has elapsed.

In the present invention, the switch is provided in the supply path of electric power from the electricity storing body to the motor. The switch is closed in the normal operating state. When an operator wishes to perform maintenance, the operator operates the setting unit such as turning ON a manual operating switch. The setting unit operate by receiving a supply of electric power from the electricity storing body, to open the switch that is provided in the supply path of the electric power from the electricity storing body to the motor. As a result, it is possible to switch to maintenance mode by causing the supply path of electric power to the motor from the electricity storing body to be open, even without shutting off the external power supply, that is, even while still in a powered state. Given this, after switching to maintenance mode it is possible to perform maintenance by moving the controlled element manually to the desired degree of opening if the external power supply is shut off. In this case, the electric power that is stored in the electricity storing body is not consumed.

Moreover, in the present invention, after maintenance has been completed and the external power supply is restored, the supply of power from the external power supply is received and the setting unit operates to close the switch that is provided in the supply path for electric power from the electricity storing body to the motor. This causes the normal operating state to be restored automatically by switching the switch automatically from the opened state to the closed state at the point in time at which power is supplied again, after the completion of maintenance. As a result, there will not be forgotten the operation for restoring the normal operating state. Moreover, the controlled element can be operated manually until the power is restored, so there are no time constraints.

Moreover, in the present invention the supply of electric power from the external power supply to the resetting unit is shut off after a specific delay time has elapsed. Given this, even in a state wherein the external power supply is supplied, it is possible to switch to the maintenance mode by, for example, turning a manual operating switch ON to cause the setting unit to operate, to open the switch that is provided in the supply path for electric power from the electricity storing body to the motor.

In the present invention, a "setting unit, operated through receiving a supply of electric power from the electricity storing body in response to an instruction from an operator, for opening the switch is provided in the supply path for electric power from the electricity storing body to the motor" are not absolutely necessary. For example, the switch with a resetting function that is provided in a supply path for electric power to the motor from the electricity storing body may be something that may be opened manually.

Given the present invention, although the switch is provided in the supply path of electric power from an electricity storing body to a motor, a resetting unit for closing the switch that is provided in the supply path of electric power from an electricity storing body to a motor is provided so as to operate by receiving a supply of electric power from the external power supply when there has been a recovery from an interruption in the external power supply, and the supply of electric power from the external power supply to the resetting unit is shut off after a specific delay time, making it possible to switch to the maintenance mode even if the external power supply is not shut off, that is, even when in a powered state.

Given this, shutting off the external power supply after switching to maintenance mode, makes it possible to perform maintenance by moving the controlled element manually to the desired degree of opening, making it possible to get by without consuming the electric power that is stored in the electricity storing body.

Moreover, in the present invention, after maintenance has been completed and the external power supply is restored, the supply of power from the external power supply is received and the resetting unit operates to close the switch that is provided in the supply path for electric power from the electricity storing body to the motor, making it possible for the normal operating state to be restored automatically by switching the switch automatically from the opened state to the closed state at the point in time at which power is supplied again, after the completion of maintenance, enabling maintenance to be performed without forgetfulness of the operation for restoring the normal operating state, and without a time constraint.

BRIEF DESCRIPTION OF THE DRAWINGS

FIG. 2 is a diagram for explaining the operation of the electric actuator when the power supply switch is ON.

DETAILED DESCRIPTION

Figure 1:
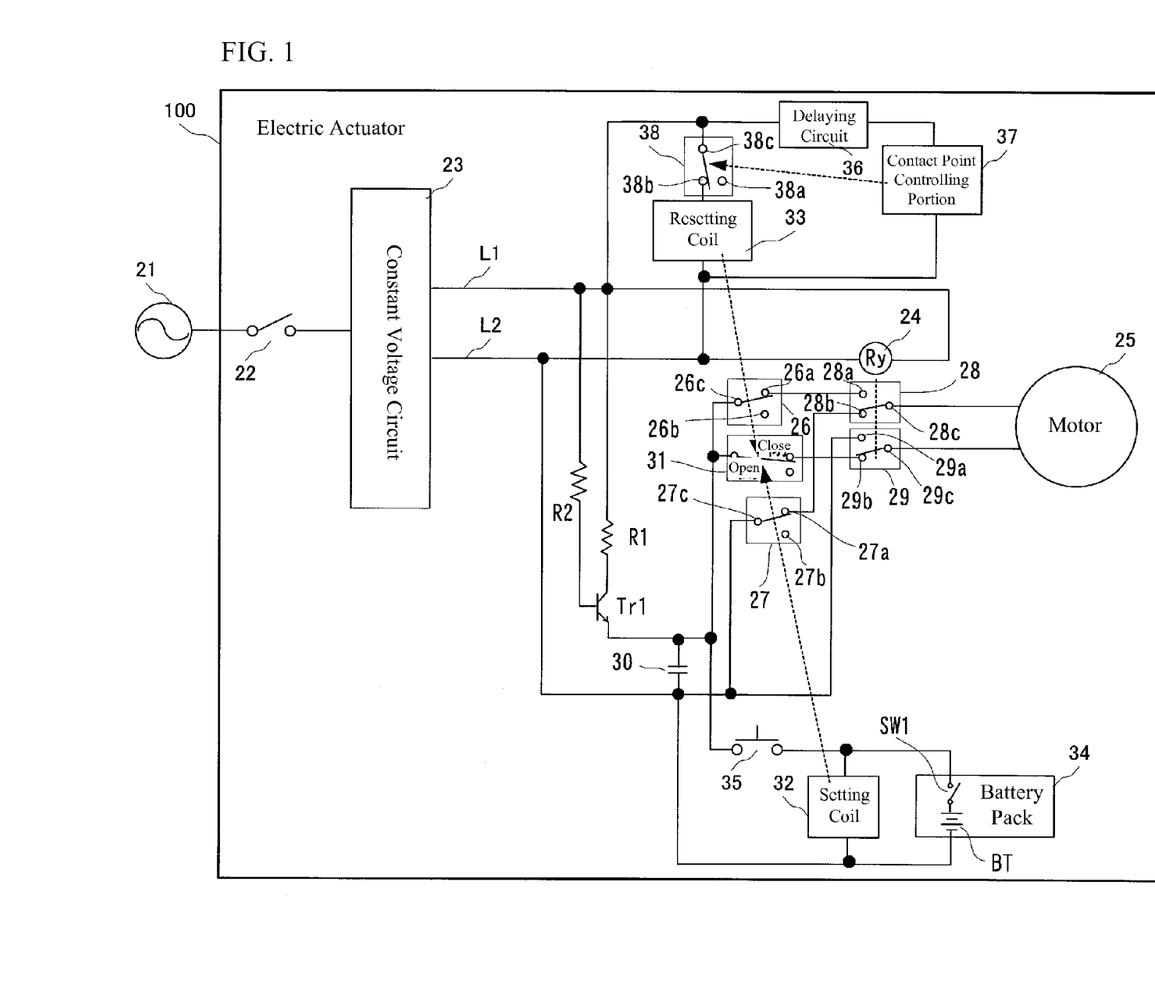
FIG. 1 is a circuit diagram illustrating the critical portions of an example of an electric actuator according to the present invention.

A form of example according to the present invention will be explained below in detail, based on the drawings. FIG. 1 is a circuit diagram illustrating the critical portions in an example of an electric actuator according to the present invention.

In FIG. 1, 21 is a commercial power supply, 22 is a power supply switch, 23 is a constant voltage circuit for converting an AC voltage into a specific DC voltage, 24 is a relay, 25 is a motor (DC motor) for driving the controlled element (not shown) such as a valve or a damper, 26 is a opening-side limit switch, 27 is a closing-side limit switch, 28 and 29 are contact points (relay contact points) of the relay 24, 30 is an electricity storing body (electric double-layer capacitor), 31 is a contact point (latching relay contact point) for a latching relay corresponding to the switch in the present invention, 32 is a setting coil for the latching relay, corresponding to the setting unit in the present invention, 33 is a resetting coil for the latching relay, corresponding to the resetting unit in the present invention, 34 is a battery pack, 35 is a contact point automatic returning switch, 36 is a delaying circuit, 37 is a contact point controlling portion, 38 is a contact point controlled by the contact point controlling portion 37, Tr1 is a transistor, and R1 and R2 are resistances.

In the electric actuator 100, the respective terminals of the motor 25 are connected to a common terminal 28c of the relay contact point 28 and a common terminal 29c of the relay contact point 29. Moreover, a normally-open contact point terminal 28a of the relay contact point 28 is connected to a terminal 26a of the opening-side limit switch 26, and a normally-closed contact point terminal 28b of the relay contact point 28 is connected to a terminal 27a of the closing-side limit switch 27. Furthermore, a normally-closed contact point terminal 29b of the relay contact point 29 is connected to a common terminal 26c of the opening-side limit switch 26 and also to one end of the electricity storing body 30 through the latching relay contact point 31, and a normally-open contact point terminal 29a of the relay contact point 29 is connected to a common terminal 27c of the closing-side limit switch 27 and also to the other terminal of the electricity storing body 30.

One terminal of the electricity storing body 30 is connected to an output line L1 for the DC voltage from the constant voltage circuit 23 through the transistor Tr1 and the resistance R1, and the other terminal of the electricity storing body 30 is connected to an output line L2 for the DC voltage from the constant voltage circuit 23. The resistance R2 is connected between the output line L1 for the DC voltage from the constant voltage circuit 23 and the base of the transistor Tr1. The relay 24 is connected between the output lines L1 and L2 for the DC voltage from the constant voltage circuit 23.

The setting coil 32 is connected between one terminal and the other terminal of the electricity storing body 30, and the contact point automatic returning switch 35 is connected to a connecting line between the setting coil 32 and one terminal of the electricity storing body 30. The battery pack 34 has a circuit configuration wherein a battery BT and a switch SW1 are connected in series, and, if necessary, is connected in parallel with the setting coil 32. The connection of the battery pack 34 will be described below.

The delaying circuit 36 is structured from an RC filter, or the like, delays by a specific time the timing with which the electric power is provided to the contact point controlling portion 37. The contact point controlling portion 37 is, for example, a relay coil, and turns the contact point 38 ON/OFF. The contact point 38 is provided with a common terminal 38c, a contact point terminal 38a, and a b contact point terminal 38b, where normally the common terminal 38c and the b contact point terminal 38b are ON, and where, when the contact point controlling portion 37 is operated through receiving a supply of electric power through the delaying circuit 36, the common terminal 38c and the a contact point terminal 38a are turned ON. In this example, a state wherein the common terminal 38c and the b contact point terminal 38b are ON is an ON state of the contact point 38, and a state wherein the common terminal 38c and the a contact point terminal 38a are ON is an OFF state of the contact point 38.

The common terminal 38c of the contact point 38 is connected to the DC voltage output line L1 from the constant voltage circuit 23, and the contact point terminal 38b of the contact point 38 is connected to one terminal of the resetting coil 33. The other terminal of the resetting coil 33 is connected to the output lines L2 for the DC voltage from the constant voltage circuit 23. The setting coil 32, when excited through the application of an electric current, opens the latching relay contact point 31, and the resetting coil 33, when excited through the application of an electric current, closes the latching relay contact point 31.

Note that while in this example the power supply switch 22 is provided as a structural element of the electric actuator 100, it may be instead external to the electric actuator 100. Moreover, although not illustrated in FIG. 1, a handle, or the like, for opening and closing may be provided as manual opening operating means whereby the opening of the controlled element may be controlled when the motor 25 is not driven. Moreover the base of a transistor, or the like, may be considered, instead of the relay coil, for the contact point controlling portion 37. Furthermore, the use of the emitter-collector of a transistor may be considered instead of the contact point of a relay for the contact point 38 as well.

When, in this electric actuator 100, the power supply switch 22 is turned ON, a DC voltage is outputted from the constant voltage circuit 23, the relay 24 is magnetically excited, and the relay contact points 28 and 29 respectively switch to the normally-open contact point terminal 28a and 29a sides. At this time, let us assume that the controlled element that is driven by the motor 25 is in an intermediate opening state, where the opening-side limit switch 26 is at the terminal 26a side and the closing-side limit switch 27 is at the terminal 27a side. Moreover, let us assume that a full-open instruction has been received as an opening instruction.

Figure 2:
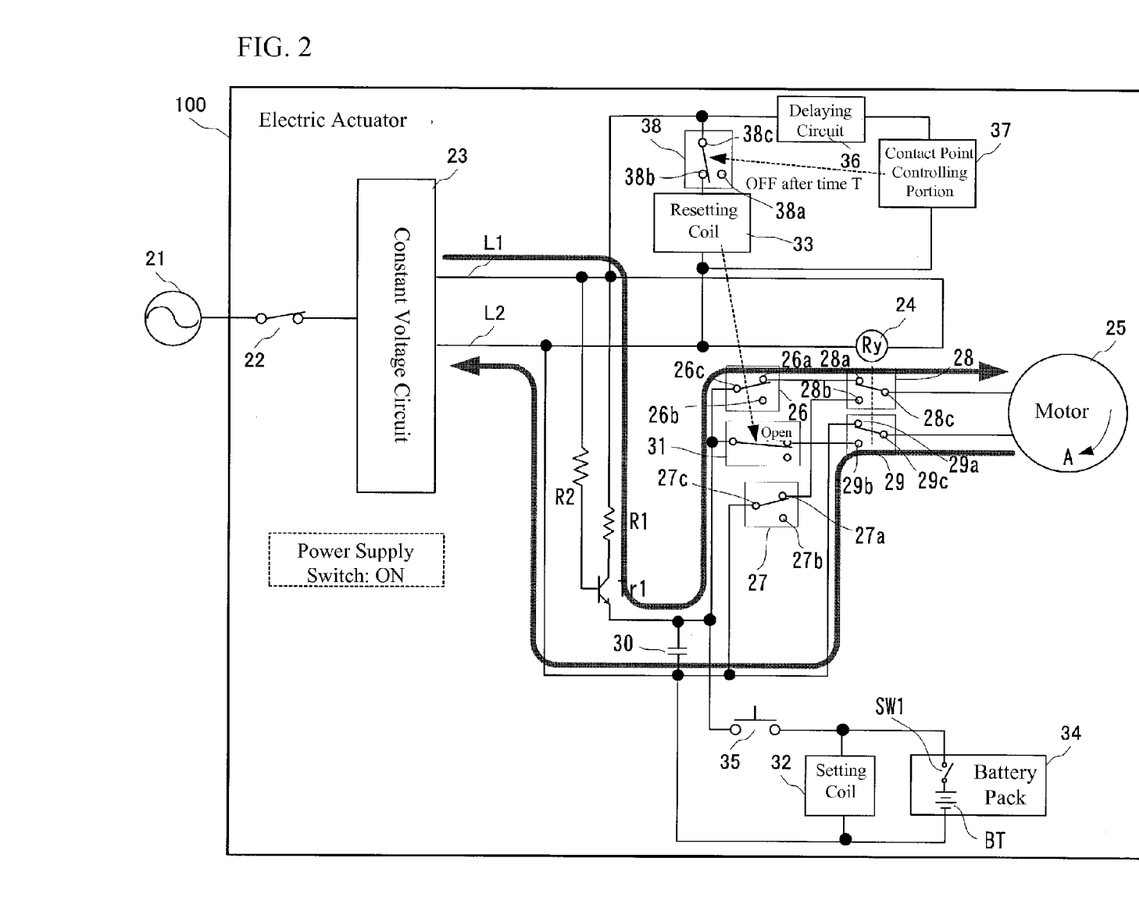

Given this, an electric current flows in the path indicated by the arrow in FIG. 2, so the motor 25 rotates in the direction of the arrow A, driving the controlled element in the opening direction. Given this, when the opening-side limit switch 26 operates to switch to the terminal 26b side, that is, when the controlled element is fully open, the motor 25 is stopped. On the other hand, the electricity storing body 30 receives a supply of electric power through the resistance R1 and the transistor Tr1, to be charged.

Moreover, the latching relay contact point 31 is put into the closed state because the resetting coil 33 is excited through an electric current. This closed state is the normal operating state for the latching relay contact point 31. Note that the excitation of the resetting coil 33 through the application of an electric current may be canceled through the contact point controlling portion 37, using the delaying circuit 36, turning OFF the contact point 38 after a specific delay time T has elapsed. Because of this, the latching relay contact point 31 enters a state wherein it can be opened by the setting coil 32.

[Emergency Shutdown when there is a Power Outage]

Figure 3:
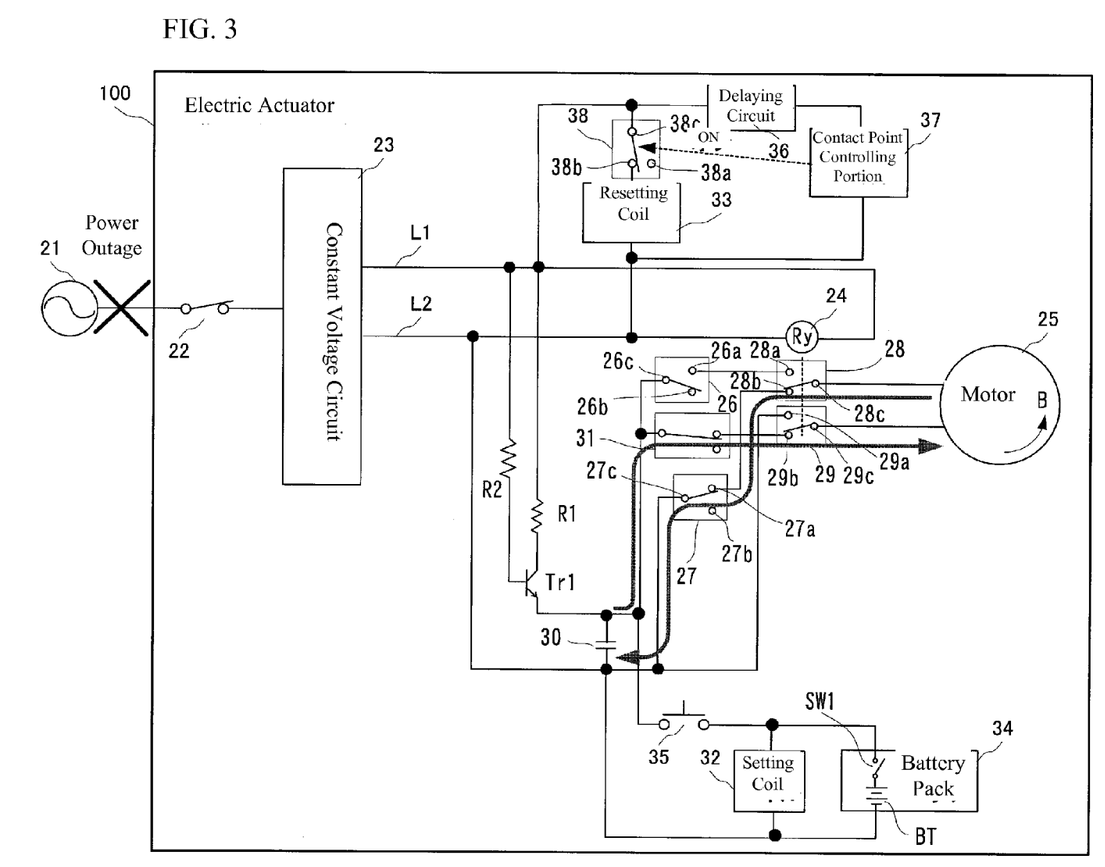
FIG. 3 is a diagram for explaining the operation of the electric actuator when there is a power outage.

If a power outage occurs when in this state, that is, if the external power supply is cut off (referencing FIG. 3) so that the DC voltage ceases to be outputted from the constant voltage circuit 23, the magnetic excitation of the relay 24 disappears, and the relay contact points 28 and 29, respectively, switch to the normally-closed contact point terminal 28b and 29b sides. At this time, the electric power that is stored in the electricity storing body 30 causes a current to flow through the path indicated by the arrow in FIG. 3, causing the motor 25 to rotate in the direction of the arrow B (that is, to rotate in the reverse direction) to drive the controlled element in the closing direction. Given this, when the closing-side limit switch 27 operates to switch to the terminal 27b side, that is, when the controlled element is fully closed, the motor 25 stops. On the other hand, because the supply of electric power to the contact point controlling portion 37 is cut off by the power outage, the contact point 38 is turned ON.

Maintenance

In the present example, there are two methods for switching to the maintenance mode (described below). One is a method where switching to the maintenance mode is after turning the power supply switch 22 OFF, and the other is a method where switching to the maintenance mode is done with the power supply switch 22 still on. Both methods will be described below, defining as "method 1" the method wherein switching to the maintenance mode is after turning the power supply switch 22 OFF, and defining as "method 2" the method wherein switching to the maintenance mode is done with the power supply switch 22 still on.

Method 1

Method Wherein Switching to the Maintenance Mode is after Turning the Power Supply Switch OFF When the power supply switch 22 is turned OFF at the time of maintenance (referencing FIG. 4), the DC voltage ceases to be outputted from the constant voltage circuit 23 because a situation that is identical to that of a power outage occurs. As a result, an electric current flows in the path indicated by the arrow in FIG. 4, causing the motor 25 to rotate in the direction of the arrow B (that is, to rotate in the reverse direction), to drive the controlled element in the closing direction, in the same manner as for the "Emergency Shutdown When There Is a Power Outage," described above. Given this, when the closing-side limit switch 27 operates to switch to the terminal 27b side, that is, when the controlled element is fully closed, the motor 25 stops.

Figure 4:
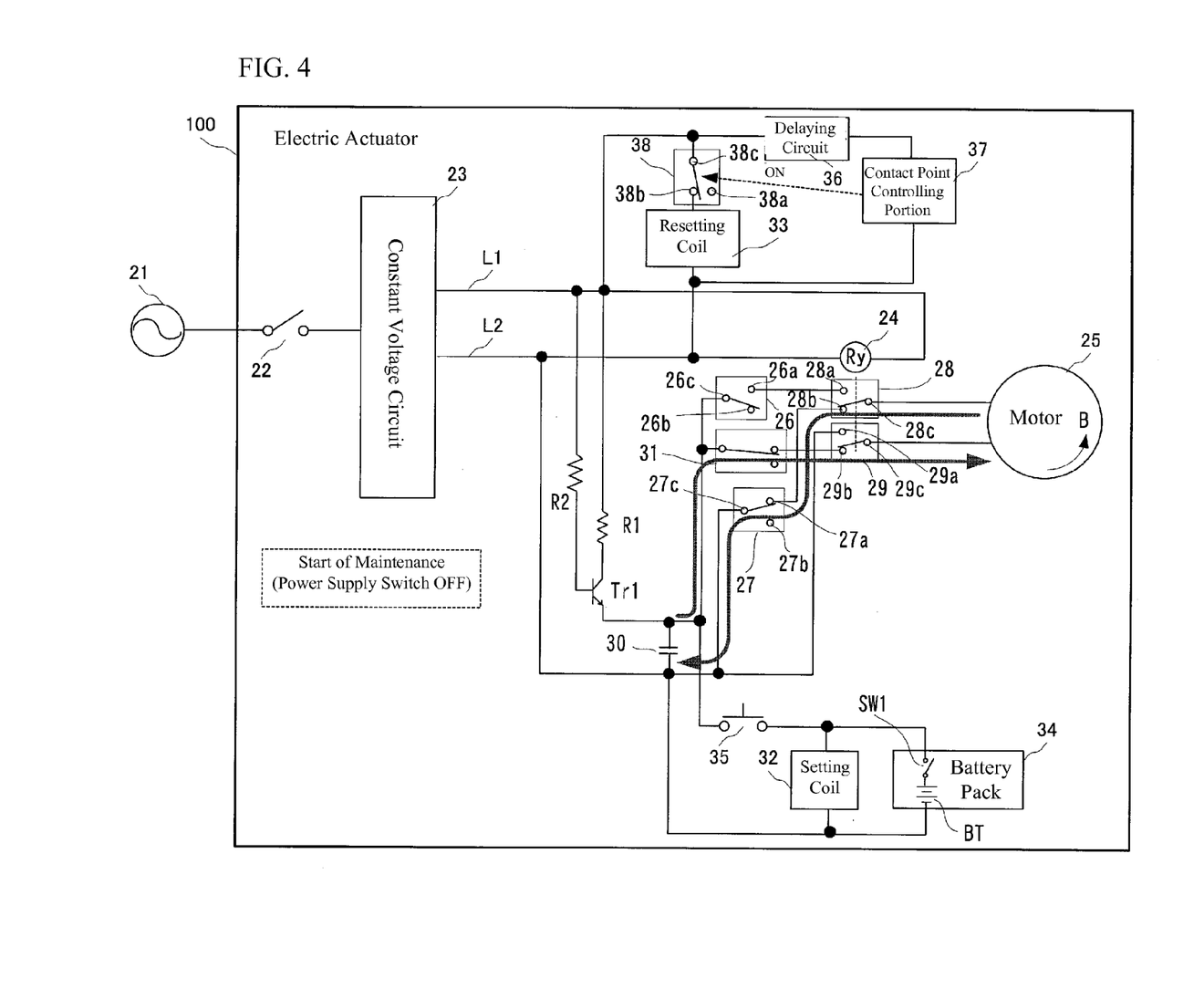
FIG. 4 is a diagram for explaining the operation of a electric actuator of method 1 when the power supply switch is turned OFF at the time of maintenance.

In this case, the contact point 38 is turned ON after the supply of electric power to the contact point controlling portion 37 is cut off. However, notwithstanding the contact point 38 being turned ON, the power supply switch 22 is OFF, so the resetting coil 33 is not excited through the application of an electric current. Consequently, the state wherein the latching relay contact point 31 can be opened by the setting coil 32 is maintained.

Following this, the operator turns the contact point automatic returning switch 35 ON. This contact point automatic returning switch 35 is ON only when being pressed by the operator, and when the pressing stops, it recovers automatically to the OFF state. When the contact point automatic returning switch 35 is turned ON, the setting coil 32 is excited by an electric current through the receipt of supply of electric power from the electricity storing body 30, opening the latching relay contact point 31 (referencing FIG. 5).

Figure 6:
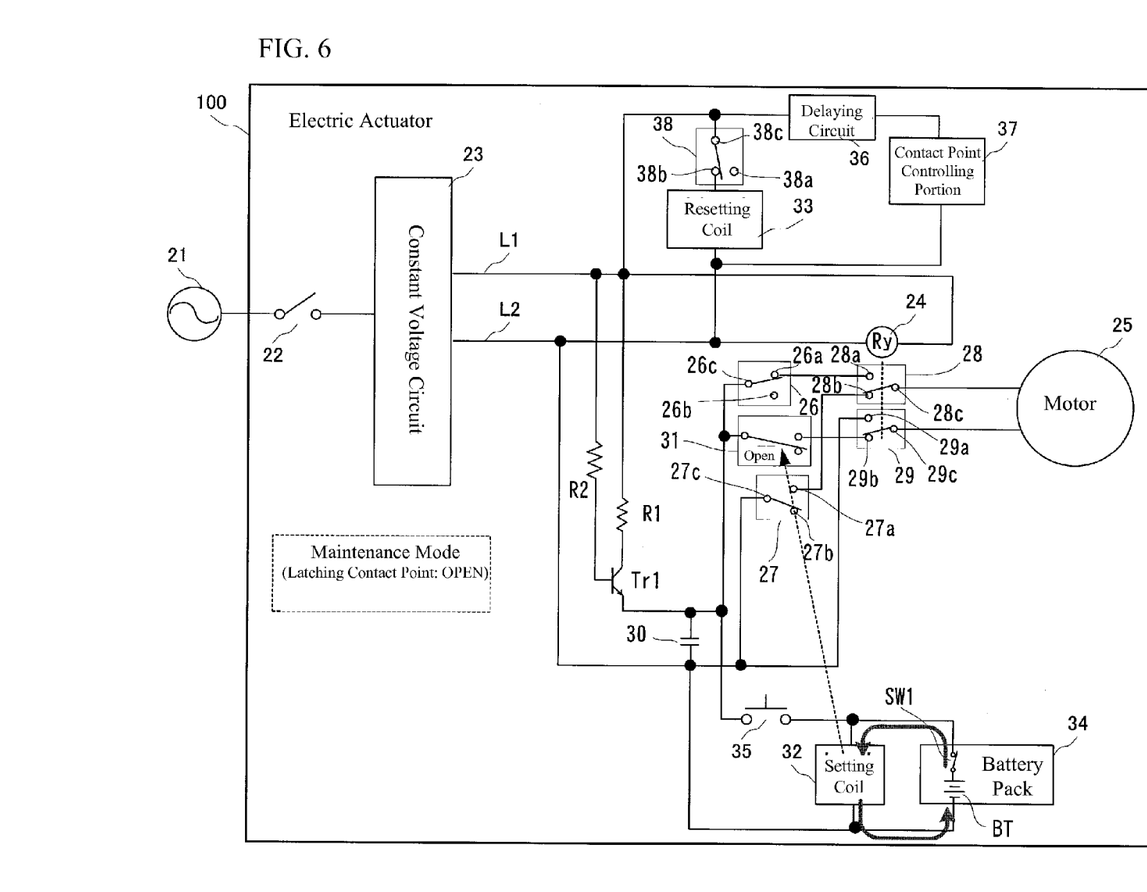
FIG. 6 is a diagram illustrating the state of transition to the maintenance mode (when the battery pack is used) at the time of maintenance of this electric actuator of method 1.

Note that if there is no electric power stored in the electricity storing body 30 so that the setting coil 32 is not excited by an electric current notwithstanding the contact point automatic returning switch 35 being turned ON, a battery pack 34 is connected in parallel with the setting coil 32 and the switch SW1 is turned ON to apply electric power from the battery BT to the setting coil 32, to open the latching relay contact point 31 (referencing FIG. 6).

Figure 5:
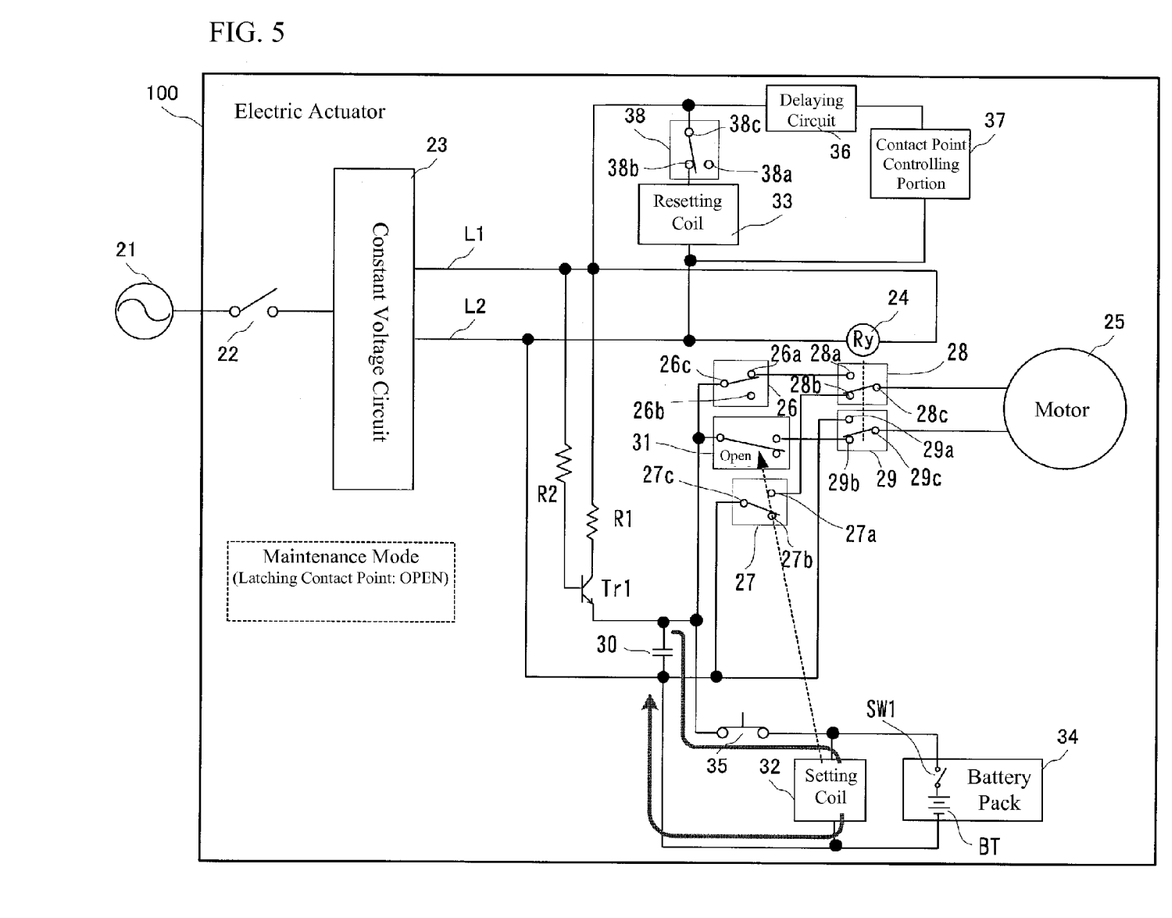
FIG. 5 is a diagram illustrating the state of transition to the maintenance mode (when the setting coil is used) at the time of maintenance of this electric actuator of method 1.

The state wherein the latching relay contact point 31 has been opened is termed the "maintenance mode." That is, in this method 1, after the power supply switch 22 is turned OFF, the electric actuator 100 is switched into the maintenance mode by turning the contact point automatic returning switch 35 ON, or by connecting the battery pack 34 and turning the switch SW1 ON.

When, in this maintenance mode, the controlled element is driven open by a manual operation of the handle, no electric power that is stored in the electricity storing body 30 will be supplied to the motor 25 even if the closing-side limit switch 27 operates to switch to the terminal 27a side. This makes it possible to manually drive the controlled element open, even without discharging the electric power that is stored in the electricity storing body 30.

Method 2

Figure 7:
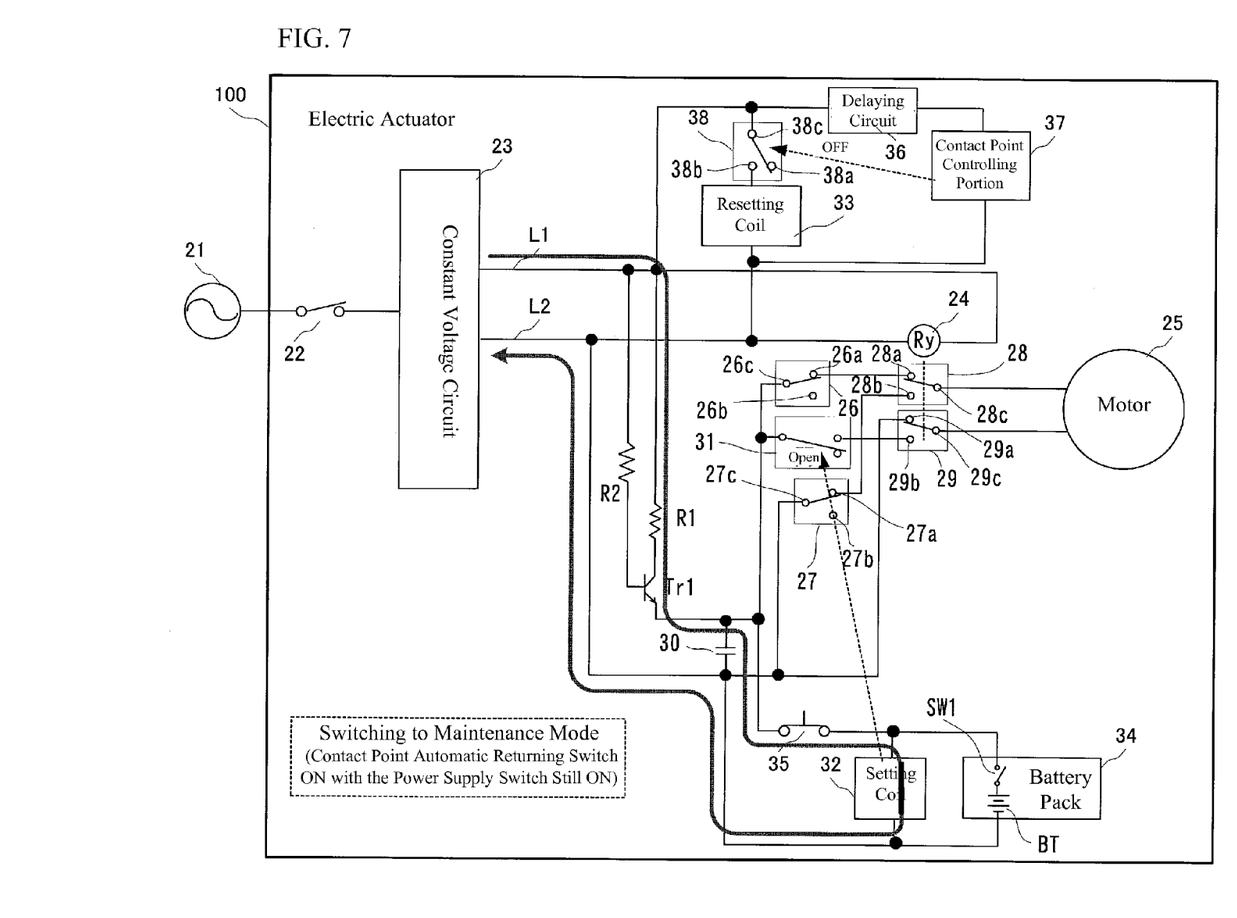
FIG. 7 is a diagram illustrating the state of transition to the maintenance mode at the time of maintenance of this electric actuator of method 2.

Method Wherein Switching to the Maintenance Mode is with the Power Supply Switch still ON When an operator wishes to perform maintenance, the operator turns the contact point automatically returning switch 35 ON with the power supply switch 22 still ON (referencing FIG. 7).

In this case, the supply of electric power to the contact point controlling portion 37 is still continuing, so the contact point 38 is OFF. Consequently, the resetting coil 33 is not excited through the application of an electric current, thus making it possible for the latching relay contact point 31 to be opened by the setting coil 32.

The contact point automatic returning switch 35 is ON only when being pressed by the operator, and when the pressing stops, it recovers automatically to the OFF state. When the contact point automatic returning switch 35 is turned ON, the setting coil 32 is excited by an electric current through the receipt of supply of electric power from the constant voltage circuit 23, opening the latching relay contact point 31. As a result, the state will be one wherein the supply path of the electric power to the motor 25 from the electricity storing body 30 is cut off, switching to maintenance mode. Thereafter, the operator turns the power supply switch 22 OFF (referencing FIG. 8).

Figure 8:
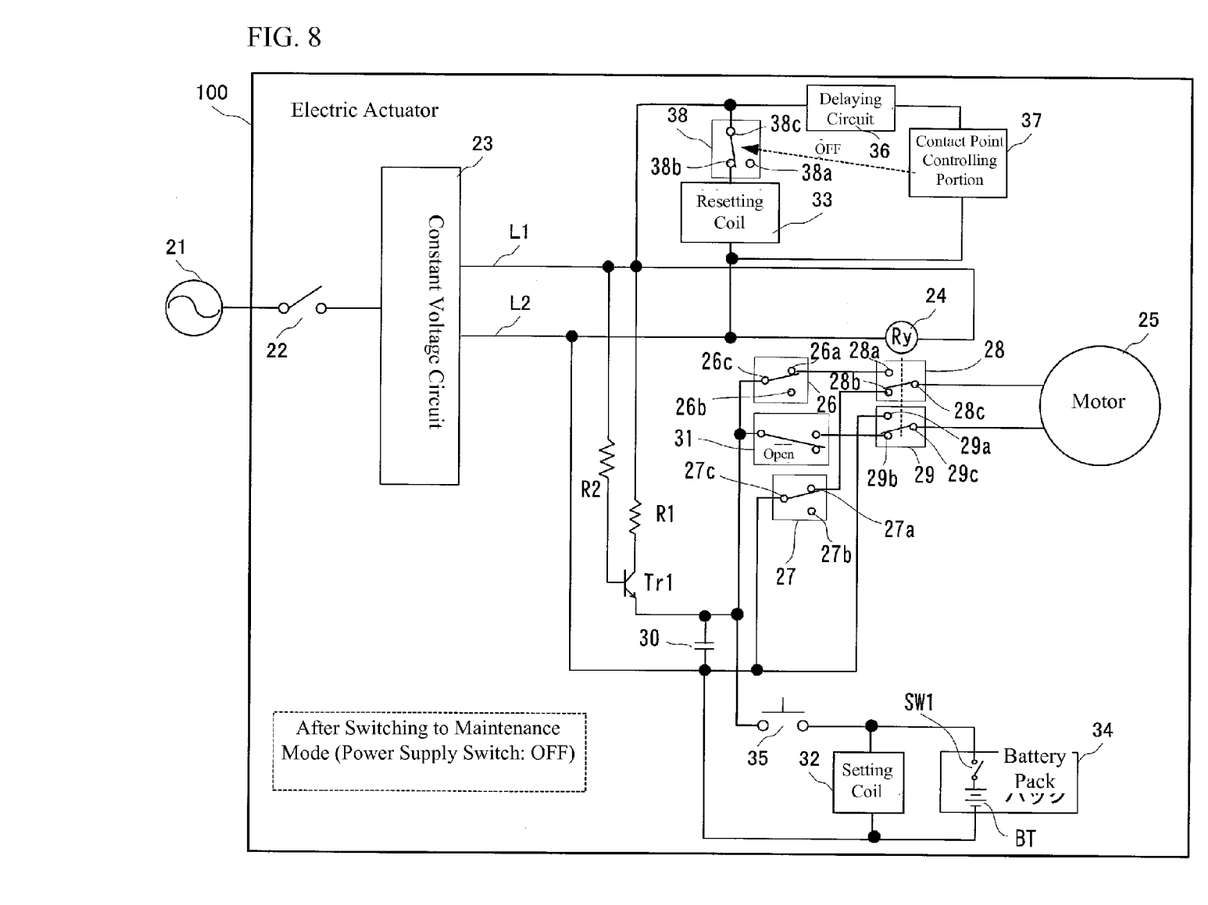
FIG. 8 is a diagram illustrating the state wherein the power supply switch has been turned OFF after the transition to the maintenance mode at the time of maintenance of this electric actuator of method 2.

That is, in this method 2, the power supply switch 22 is turned OFF by switching the electric actuator 100 into the maintenance mode by turning the contact point automatic returning switch 35 ON with the power supply switch 22 still turned ON.

In this case, the latching relay contact point 31 is open so that no electric power is supplied from the electricity storing body 30 to the motor 25, notwithstanding the power supply switch 22 being OFF, and thus the motor 25 is stopped in the current position. After the power supply switch is turned OFF, the controlled element may be moved by operating the handle manually, enabling maintenance to be performed.

In this method 2, the electric power that is stored in the electricity storing body 30 is not consumed, and there is no need to forcibly drive the motor 25 by the electric power that is stored in the electricity storing body 30 to drive the controlled element to the specific opening, as it is in method 1.

Completion of Maintenance

When, after maintenance has been completed, the power supply switch 22 is turned ON, that is, when the external power is restored to restore the powered state (referencing FIG. 9), the resetting coil 33 is operated through the receipt of the DC voltage from the constant voltage circuit 23, to close the latching relay contact point 31.

Figure 9:
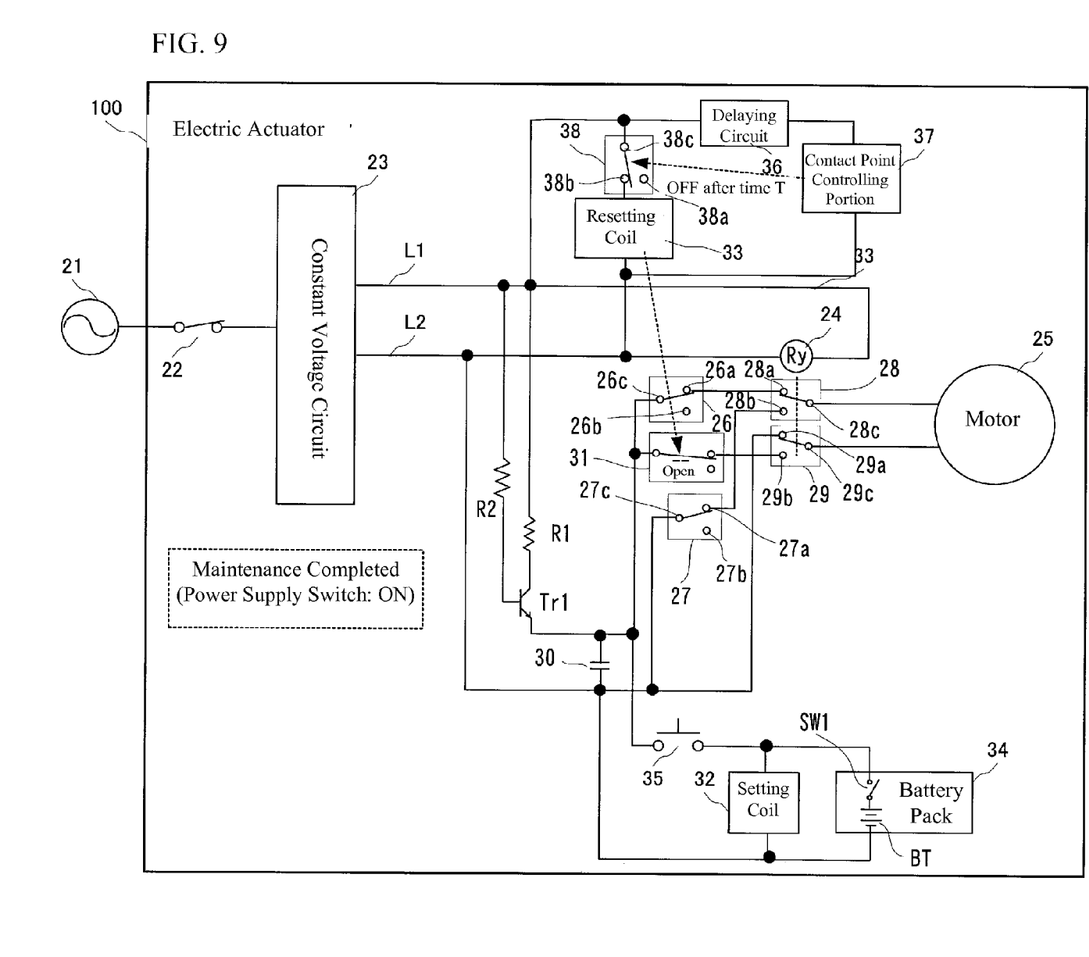
FIG. 9 is a diagram illustrating the state of the electric actuator when the power supply switch is turned ON when maintenance has been completed.

As a result, at the point in time that power is restored after maintenance has been completed, the latching relay contact point 31 is switched automatically from open to closed, automatically restoring the normal operating state. As a result, there will not be forgotten the operation for restoring the normal operating state. Moreover, the controlled element can be operated manually until the power is restored, so there are no time constraints.

Moreover, when the power supply switch 22 is turned ON, the relay 24 is operated by receiving the DC voltage from the constant voltage circuit 23, so the relay contact points 28 and 29 respectively switch to the normally-open contact point terminal 28a and 29a sides. As a result, the supply of electric power from the constant voltage circuit 23 to the motor 25 is started, restarting the control operations for the opening of the controlled element from a state wherein the opening of the controlled element, at the time of maintenance, was maintained at an arbitrary position other than fully-closed.

Moreover that the excitation of the resetting coil 33 through the application of an electric current may be canceled through the contact point controlling portion 37, using the delaying circuit 36, turning OFF the contact point 38 after a specific delay time T has elapsed. Because of this, the latching relay contact point 31 enters a state wherein it can be opened by the setting coil 32, regardless of the ON/OFF state of the power supply switch 22.

Figure 10:
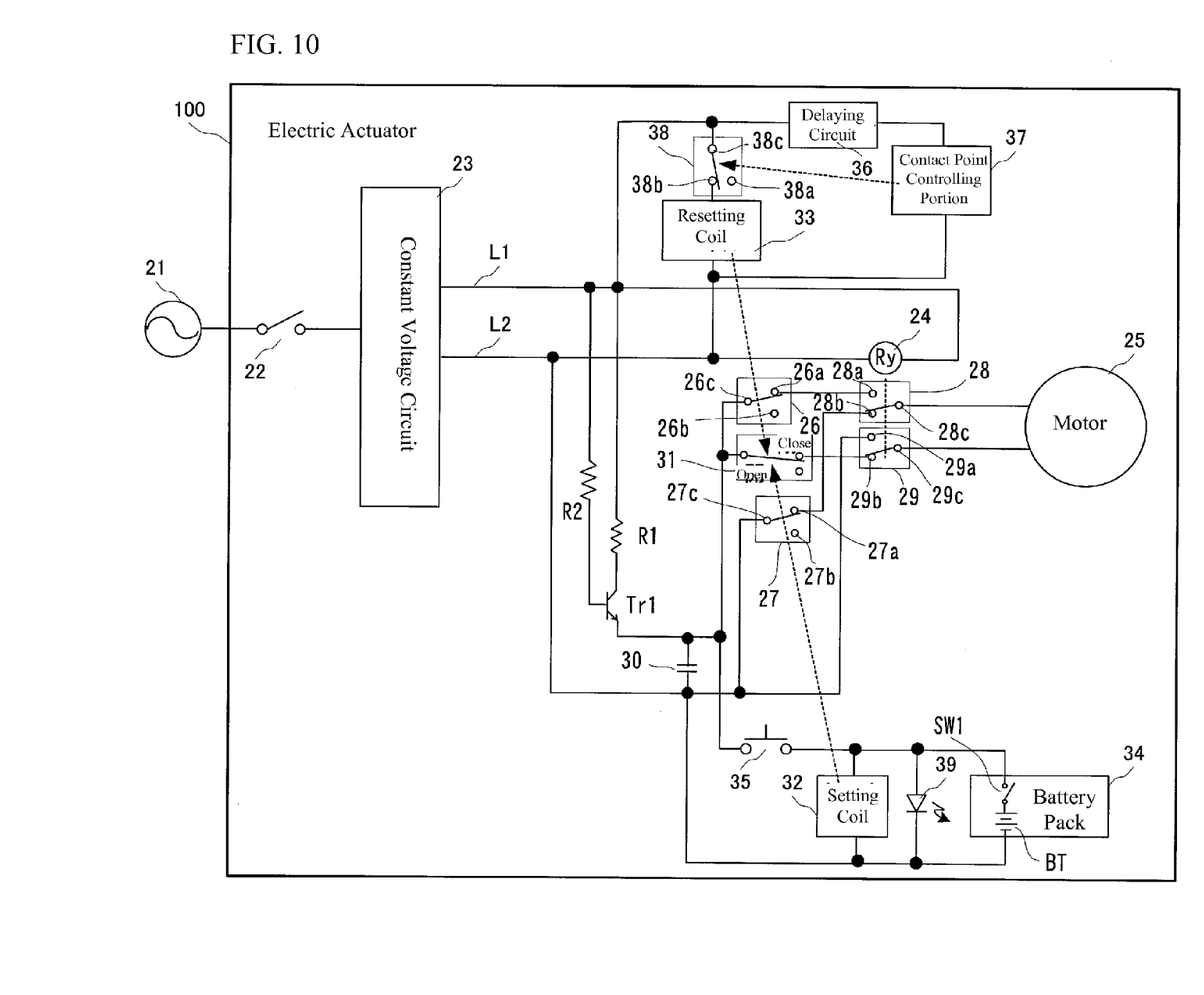
FIG. 10 is a diagram illustrating an example wherein an LED (light-emitting diode) is provided to provide notification that the setting coil has been operated.

Note that as illustrated in FIG. 10, an LED (light-emitting diode) 39 may be connected in parallel with the setting coil 32, to provide notification when the setting coil 32 has been operated. That is, in method 1, for example, insofar as there is electric power stored in the electricity storing body 30, when the contact point automatic returning switch 35 has been turned ON, the LED 39 is supplied power accompanying the supply of electric power from the electricity storing body 30 to the setting coil 32, causing the LED 39 to illuminate, to provide notification that the latching relay contact point 31 has been opened.

If the LED 39 is not illuminated, then it can be concluded that there is no electric power in the electricity storing body 30, and so the battery pack 34 is connected in parallel to the setting coil 32 and the switch SW1 is turned ON to apply electric power from the battery BT to the setting coil 32 to open the latching relay contact point 31. At this time, power is supplied to the LED 39 accompanying the supply of electric power from the battery pack 34 to the setting coil 32, causing the LED 39 to illuminate, providing notification that the latching relay contact point 31 has been opened.

Note that while in the example set forth above the latching relay contact point 31 was used as the switch, the setting coil 32 of the latching relay was used as the setting unit, and the resetting coil 33 with of the latching relay was used as the resetting unit, there is no limitation to such a configuration.

That is, the switch needs only be able to open and close the supply path of the electric power from the electricity storing body 30 to the motor 25 in response to an instruction from an operator, the setting unit needs only be able operate by receiving a supply of electric power from the electricity storing body 30 to open the switch that is provided in the supply path of the electric power from the electricity storing body 30 to the motor 25, and the resetting unit needs only be able operate by receiving a supply of electric power from the external power supply, when there has been a recovery in an interruption to the external power supply, to open the switch that is provided in the supply path of the electric power from the electricity storing body 30 to the motor 25, in which case the configuration by which to do so does not matter.

Moreover, a buzzer may be provided instead of the LED 39, and, insofar as it is an element that can be sensed by the five human senses, any means may be used.

Figure 11:
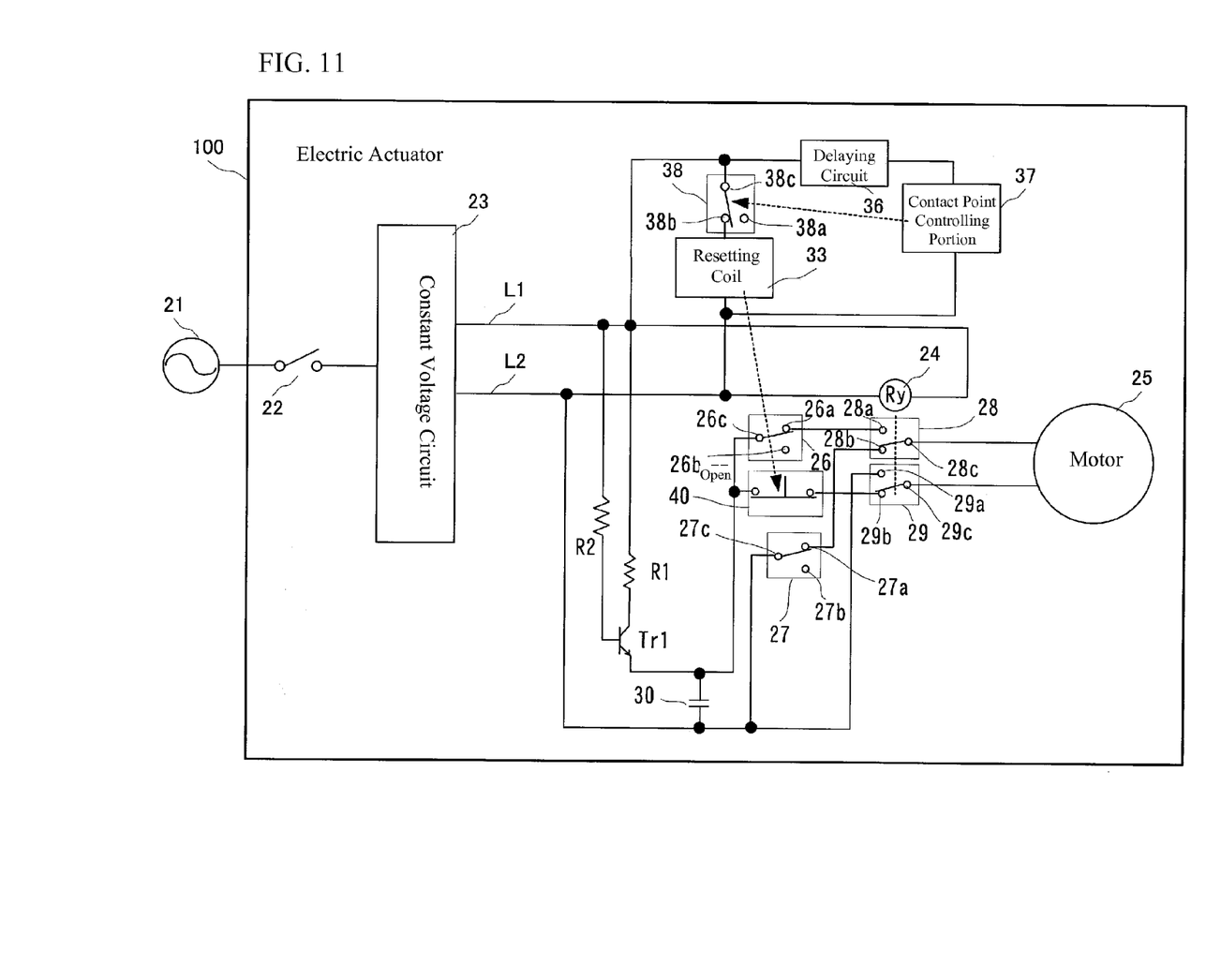
FIG. 11 is a diagram illustrating an example wherein a switch with a resetting function is provided instead of the latching relay contact point.

Moreover, as illustrated in FIG. 11, the setting coil 32, the battery pack 34, and the contact point automatic returning switch 35 may be eliminated from the configuration illustrated in FIG. 1, and instead of the latching relay contact point 31, a switch 40 with a resetting function may be provided, and a resetting coil 33 that closes this switch 40 with the resetting function through excitation through the application of an electric current may be provided. In this case, the switch 40 with the resetting function, when the resetting coil 33 is not excited through the application of an electric current, can be opened through a manual operation, and is maintained in the open state until the resetting coil 33 is excited through the application of an electric current.

Extended Forms of Example

While the present invention has been explained above in reference to a form of example, the present invention is not limited to the example set forth above. The structures and details in the present invention may be varied in a variety of ways, as can be understood by one skilled in the art, within the scope of technology in the present invention.

The invention claimed is:

1. An electric actuator comprising:
a motor that receives a supply of electric power from an external power supply to drive a controlled element; and
an electricity storing body that is charged through receiving a supply of electric power from the external power supply, wherein,
at a time wherein the external power supply is cut off, the motor is driven forcibly by electric power stored in the electricity storing body, and
when the arrival of the control element, driven by the motor, at a specific opening is detected, the supply of power from the electricity storing body to the motor is cut off, the electric actuator further comprising:
a switch provided in a supply path of electric power from the electricity storing body to the motor, the switch opening and closing the supply path for electric power from the electricity storing body to the motor;
a setting unit operated through receiving a supply of electric power from the electricity storing body in response to an instruction from an operator, the setting unit opening the switch provided in the supply path for electric power from the electricity storing body to the motor;
a resetting unit operated through receiving a supply of electric power from the external power supply when the external power supply has been restored from being cut off, the resetting unit closing the switch that is provided in the supply path of electric power from the electricity storing body to the motor; and
a setting-off unit that sets off the supply of electric power from the external power supply to the resetting unit after a specific delay time has elapsed.

2. The electric actuator as set forth in claim 1, further comprising:
a battery pack that causes operation of the setting unit through supplying, to the setting unit, electric power of a battery that has been placed in response to an instruction from an operator, to open the switch that is provided in the supply path of electric power from the electricity storing body to the motor.

3. The electric actuator as set forth in claim 1, further comprising:
a notifying unit supplied with power accompanying the supply of electric power to the setting unit, the notifying unit providing notification that the setting unit have been operated.

4. An electric actuator comprising:
a motor that receives a supply of electric power from an external power supply to drive a controlled element; and
an electricity storing body that is charged through receiving a supply of electric power from the external power supply, wherein,
at a time wherein the external power supply is cut off, the motor is driven forcibly by electric power stored in the electricity storing body, and
when the arrival of the controlled element, driven by the motor, at a specific opening is detected, the supply of power from the electricity storing body to the motor is cut off, the electric actuator further comprising:
a switch provided in a supply path of electric power from the electricity storing body to the motor, the switch opening the supply path for electric power from the electricity storing body to the motor, in response to an instruction from an operator; and
a resetting unit operated through receiving a supply of electric power from the external power supply when the external power supply has been restored from being cut off, the resetting unit closing the switch that are provided in the supply path of electric power from the electricity storing body to the motor; and
a setting-off unit that sets off the supply of electric power from the external power supply to the resetting unit after a specific delay time has elapsed.

* * * * *